April 18, 1961   J. F. HORNER ET AL   2,980,515
REACTION CHAMBER
Filed March 6, 1958   2 Sheets-Sheet 1

INVENTORS:
John F. Horner
Lawrence T. Wright
BY
Michael Dufnecy
ATTORNEY

INVENTORS:
John F. Horner
Lawrence T. Wright

United States Patent Office 2,980,515
Patented Apr. 18, 1961

2,980,515
REACTION CHAMBER
John F. Horner, La Marque, Tex., and Laurence T. Wright, Homewood, Ill., assignors, by direct and mesne assignments, to Standard Oil Company, Chicago, Ill., a corporation of Indiana
Filed Mar. 6, 1958, Ser. No. 719,524
4 Claims. (Cl. 23—288)

This invention relates to a reaction chamber for gas-solid contacting operation and particularly suitable for fixed bed naphtha reforming operation.

The octane race has forced the petroleum industry to many expensive methods of upgrading the octane number of naphthas produced from crude and even cracking operations. This upgrading process is referred to as reforming and the processes wherein a catalyst is present are commonly referred to as catalytic reforming operations. In the reforming operation naphtha vapors and hydrogen are contacted with solid particulate catalyst materials at elevated temperatures and pressures. The naphtha is converted to high octane number hydrocarbons. The most common catalytic reforming operations utilize a so-called fixed-bed reaction chamber. In this operation the catalyst particles are maintained in a vessel. The vapor-hydrogen stream is introduced into the vessel above the bed of catalyst and the stream passes downwardly through the bed and is withdrawn from the vessel through a bottom outlet. These fixed bed reactors are commonly large vessels and channeling of the gaseous stream is a problem. The use of small catalyst masses increase pressure drop through the bed. Pressure drop is of importance in the lower pressure types of catalytic reformers because a small change in average pressure on a multi-reactor unit results in a change in yield of gasoline range product and even a change in octane number of the product. For example, in a 5 reactor unit using platinum catalyst a total pressure drop decrease of 20 pounds means an increase in yield of gasoline range product of 0.3 volume percent which seemingly tiny yield taken on a throughput of 15,000 barrels (42 gallons) per day means an annual saving of many thousands of dollars.

An object of the instant invention is a catalytic reaction chamber providing a decreased pressure drop. A particular object is a reaction chamber provided with an improved product vapor collector system which results in decreased pressure drop through the chamber. Other objects will become apparent in the course of the detailed description.

The improved gas-solid contacting is obtained by means of a reaction chamber, adapted for contacting a gaseous stream with particulate solid contact material, comprising a substantially circular vessel provided with upper and lower end-closures, respectively, inlet means for admitting a gaseous stream into the upper portion of said vessel, an outlet port positioned substantially centrally in said lower end-closure, a header disposed centrally in said vessel communicating with said outlet and extending upwardly a substantial distance into the interior of said vessel, a ring-like conduit positioned in said vessel substantially adjacent to the inner peripheral surface thereof approximately at the maximum cross-sectional area of said vessel, and conduits communicating with said ring-like conduit and the body portion of said header, said ring-like conduit and said conduits being provided with perforations of a size to substantially prevent passage of particulate solid material therethrough.

The invention is described in connection with the figures which form a part of this specification. It is to be understood that the figures do not reveal all the embodiments which may be devised by ordinary skill of the invention.

Figure 1:
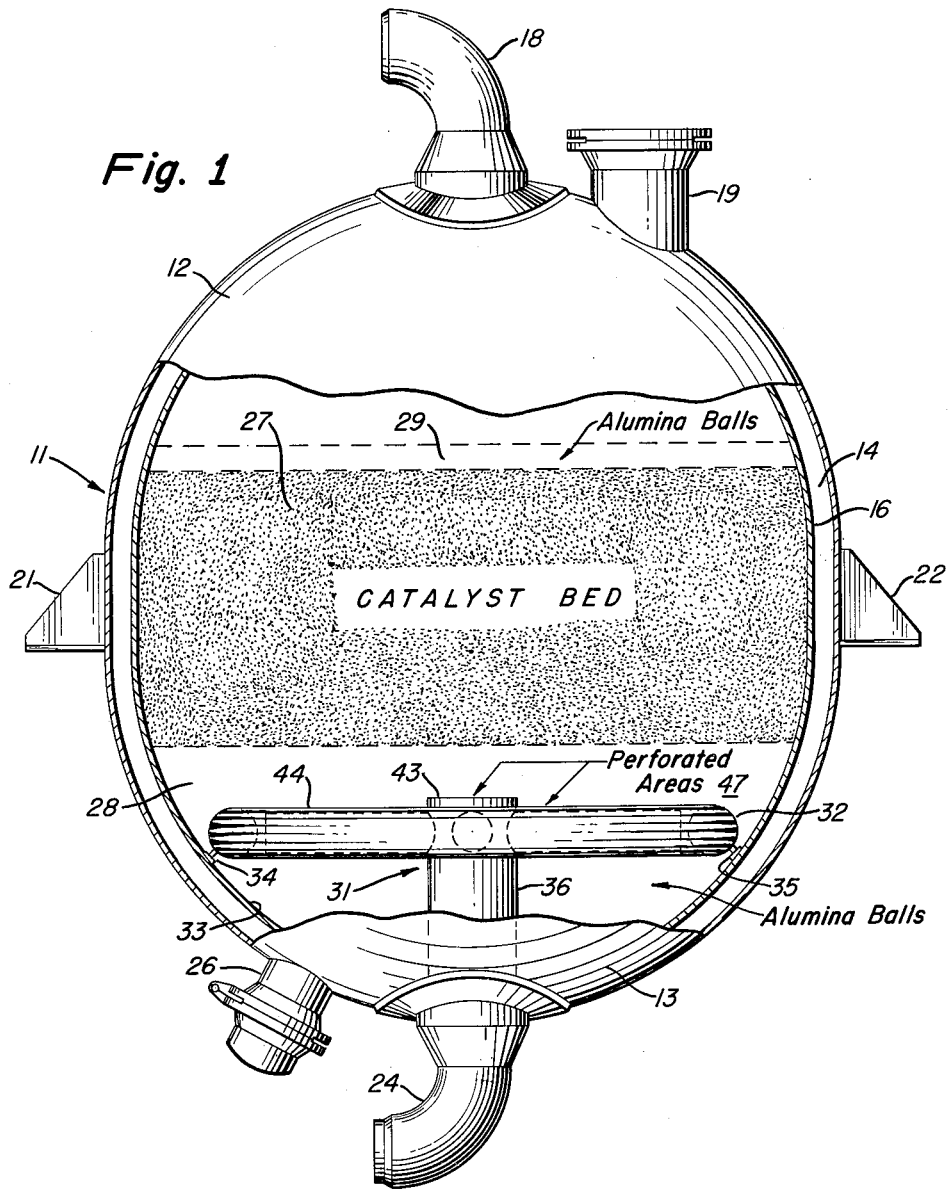
Figure 1 shows a partial sectional view of a typical fixed bed catalytic reforming reactor chamber provided with one embodiment of a vapor collector of the invention.

In Figure 1 there is shown a typical fixed bed catalytic reforming reactor suitable for commercial operation in upgrading the octane number of virgin naphtha derived from crude or cracked naphthas derived from thermal and catalytic cracking operations. The reaction chamber comprises a vessel 11. Vessel 11 is substantially circular in cross-section. Vessel 11 is provided with a curved upper end closure 12 and a curved lower end closure 13. In the instant embodiment the reaction chamber has the general appearance of a spheroid with the long axis substantially vertical to the ground. The reaction chamber may be more of a cylindrical shape with only slightly curved end closures. The degree of curvature of the end closures is determined by the cross-sectional area of the particular chamber and the particular requirements with respect to conduit sizing and entry into the chamber. The reaction chamber may indeed be a true sphere in shape. It is customary to provide the vessel with internal insulating means. In this embodiment of the invention a layer of insulating concrete 14 is positioned on the interior of the wall of vessel 11. The insulating concrete is reinforced by a steel grating 16. It is to be understood that the layer of concrete completely covers the steel grating 16.

The reaction chamber is provided with an inlet means 18 which admits the gaseous stream for example, naphtha vapors and hydrogen into the upper portion of vessel 11. A manhole 19 is provided in the upper end closure to permit entry into the interior of vessel 11 and to introduce solid particulate material therein. Shoulders 21 and 22 are shown which permit supporting the reaction chamber on foundations not shown. In the lower end closure 13 an outlet port 24 is positioned substantially centrally. A manhole conduit 26 is positioned in lower end closure 13 to permit withdrawal of the solid material from interior vessel 11.

Within vessel 11 there is positioned catalyst bed 27. The catalyst bed is made up of solid particulate material. The size of the material is dependent upon the particular operation. In catalytic reforming the particles in general are cylinders varying from ⅛ to ¼ inch in diameter and length or spheriodal material of approximately these same dimensions. The catalyst bed rests on a mass 28 of particulate solid support material through which the gaseous stream passes readily with little pressure drop. It is customary to use alumina balls for example, 1 inch in diameter for this purpose. The catalyst bed is protected at its upper surface by means of a layer 29 of particulate solid material such as alumina balls.

The naphtha vapors and hydrogen gas stream in this embodiment pass through inlet means 18 through bed 29 and pass through catalyst bed 27 wherein the conversion reactions take place. The product gaseous stream passes in part through bed 28 and through a vapor collector means and thence out by way of outlet 24. Many descriptions of a typical cracking and reforming operation are available in both the patent and technical literature; therefore, it is not necessary to describe operation prior to entry into the reaction chamber or operation beyond the reaction chamber.

Figure 2:
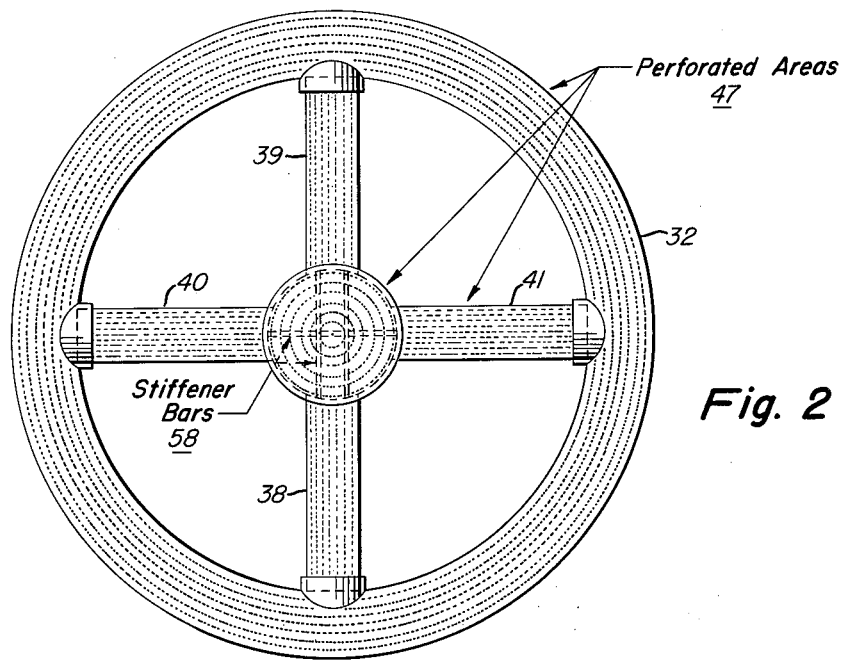
Figure 2 shows a plane view of one embodiment of a vapor collector utilized in the reaction chamber of the invention.
Figure 3:
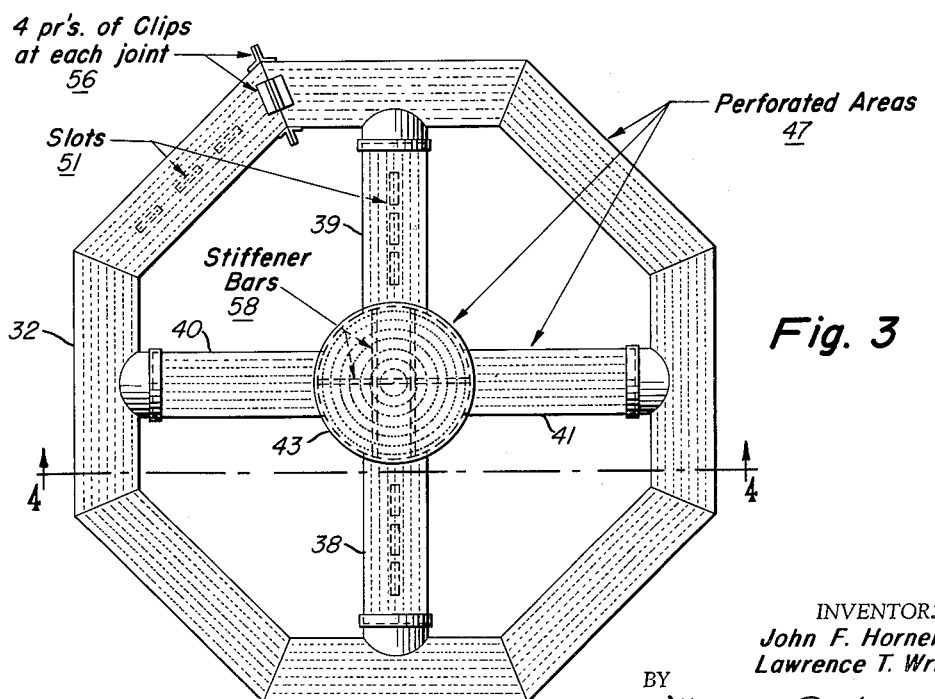
Figure 3 shows another embodiment of a vapor collector used in the reaction chamber of the invention.

The vapor collector utilized in the reaction chamber of the invention comprises a header 31 disposed centrally within vessel 11 and communicating with outlet 24. Header 31 extends upwardly into the interior of vessel 11 a substantial distance. A ring-like conduit 32 is positioned within vessel 11 substantially adjacent to the inner peripheral surface 33 of said vessel. In this embodiment ring-like conduit 32 is supported slightly away from surface 33 by means of bumper legs 34 and 35, other bumper legs distributed around the ring are not shown. It is to be understood that the conduit may be constructed so as to rest directly against surface 33. Conduits are provided communicating with ring-like conduit 32 and the body portion 36 of header 31. In Figures 2 and 3 four of these conduits namely, conduits 38, 39, 40 and 41 are shown. It is desirable to have at least three of these communication conduits; more than four may be used. The exact number of conduits will be determined by the size of ring-like conduit 32 and the dimensions of the reaction chamber itself.

Header 31 is provided with an upper end plate 43. The upper plane 44 of ring-like conduit 32 is spaced below the bottom of catalyst bed 27. It is preferred that this spacing be between about 6–12 inches in order to obtain the best flow pattern of the gaseous stream through the catalyst bed. Header 31 may extend farther into the vessel 11 than the minimum requirement determined by the positioning of ring-like conduit 32. The horizontal plane of ring-like conduit 32 is approximately at the maximum cross-sectional area of vessel 11. The diameter of the ring-like conduit 32 should be at least 70 percent of the maximum interior diameter of vessel 11. The average diameter of ring-like conduit 32 will be determined by the particular reaction chamber configuration and the particular operating conditions within said reaction chamber. In general the upper end 43 of header 31 and upper plane 44 of ring-like conduit 32 will be at substantially the same elevation in vessel 11.

Ring-like conduit 32 is provided with perforations for passage of the gaseous stream from interior of vessel 11 into the interior of the ring-like conduit. Conduits 38–41 are also provided with perforations permitting the entry of the gaseous streams into these conduits. These perforations which are not given a number in the figures are of a size to substantially prevent passage of the particulate solid material therethrough. In this embodiment the size of perforations is such that the alumina balls certainly will not pass through and the catalyst particles will in the main not pass through should any penetrate through the alumina balls to the ring-like conduit 32 or the communication conduits 38–41. In these embodiments the perforations in the upper portion 47 of ring-like conduit 32 are $5/16$ inch diameter holes set on $7/16$ inch triangular pitch. The perforated area covers an arc of 195° measured from the center horizontal plane of ring-like conduit 32 with the arc end inside the ring. The communication conduits 38–41 are perforated with $5/16$ inch holes of a 180° arc on the upper portion of the conduit. The perforations are so spaced that about 25 percent open area is provided by the perforations. In addition to the perforated upper areas ring-like conduit 32 and the communication conduits are provided with a multiplicity of slots on the lower portion of the ring-like conduit and communication conduits. These slots are 2 inches long and $3/8$ inch wide and set on 6 inch centers. A few slots 51, etc. are shown for illustrative purposes.

When the upper end 43 of header 31 is below the bottom of catalyst bed 27 it is preferred to perforate the end. In this embodiment upper end 43 is perforated with $5/16$ inch holes set on $7/16$ inch triangular pitch. The combination of perforated areas in ring-like conduit 32, communication conduits 38–41 and upper end 43 provide a very uniform flow of gaseous material through the catalyst bed with a pressure drop several pounds lower than conventional vapor collecting systems.

Figure 2 shows a vapor collector system using a true ring conduit 32. Although the use of a true ring permits mounting conduit 32 immediately adjacent the interior wall 33 of vessel 11 this is a relatively expensive shape to make within a vessel.

Figure 4:
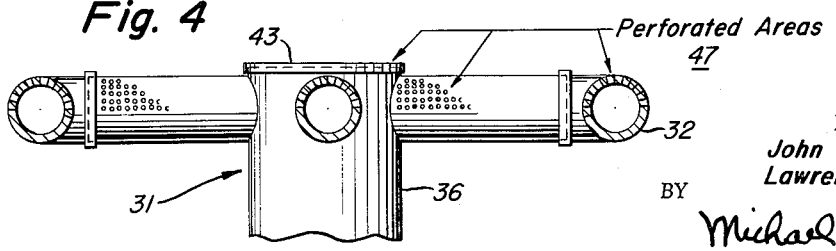
Figure 4 shows a view along the line 4—4 of Figure 3.

Figure 3 shows a more readily constructed configuration wherein ring-like conduit 32 is an eight sided polygon. It is preferred to have a polygonal tube having from 8–12 sides in order to permit a fair approximation of adjacency to the interior wall of the vessel over the length of each side of the polygon. The polygon of Figure 3 is readily fabricated by inserting the straight tube sides into the vessel and holding these together by means of clips 56. Four pairs of clips 56 are spot welded at each joint thereby providing additional gaseous entry openings between the clips of each joint. Figure 4 shows the location of the perforated areas on the various portions of the ring 32, the communication conduits 38–41 and upper end 43 of header 31.

Upper end 43 of header 31 in this embodiment is a plate 22 inches O.D. and $1/4$ inch thick. In view of the weight pressing on this end, end 43 is provided with three stiffener bars 58, etc. It is to be understood that when header 31 extends upwards into the catalyst bed or beyond upper end 43 will not be perforated.

It is to be understood that the embodiments set out in this disclosure are merely illustrative; many modifications of the ring-like conduit, communication conduits and header may be readily devised which will provide essentially the same advantages with respect to pressure drop through the catalyst bed and stream flow pattern afforded by the illustrative embodiments.

Thus having described the invention, what is claimed is:

1. A reaction chamber, adapted for contacting a gaseous stream with particulate solid contact material, comprising a substantially spheroidal vessel provided with curved upper and lower end-closures, respectively, inlet vapor conduit positioned in said upper end-closure for admitting a gaseous stream into the upper portion of said vessel, an outlet vapor port positioned substantially centrally in said lower end-closure for passing vapors out of said chamber, a header disposed centrally in said vessel communicating with said outlet vapor conduit and extending upwardly a substantial distance into the interior of said vessel, a ring-shaped conduit positioned in said vessel substantially adjacent to the inner peripheral surface thereof approximately at the maximum cross-sectional area of said vessel to provide a diameter of said ring-shaped conduit of at least 70% of the maximum interior diameter of said vessel, and at least three conduits communicating with said ring-shaped conduit and the body portion of said header, said ring-shaped conduit and said communication conduits being provided with perforations of a size to substantially prevent passage of particulate solid material therethrough.

2. The chamber of claim 1 wherein said ring-shaped conduit is a polygonal tube.

3. The chamber of claim 1 wherein the upper end of said header and the upper plane of said ring-shaped conduit are at substantially the same elevation.

4. The chamber of claim 3 wherein the upper end of said header is provided with perforations of a size to substantially prevent passage of particulate solid material therethrough.

References Cited in the file of this patent

UNITED STATES PATENTS

| | | |
|---|---|---|
| 522,043 | Bowden | June 26, 1894 |
| 938,778 | Morrison | Nov. 2, 1909 |
| 2,467,433 | King | Apr. 19, 1948 |
| 2,657,121 | Rollins | Oct. 27, 1953 |
| 2,664,347 | Rehsig | Dec. 29, 1953 |
| 2,833,631 | Rossheim | May 8, 1958 |
| 2,892,262 | Shirk | June 30, 1959 |